United States Patent
Povalac et al.

(10) Patent No.: US 11,777,228 B2
(45) Date of Patent: Oct. 3, 2023

(54) MULTI-POLARIZED ANTENNA ARRAY

(71) Applicant: NXP USA, Inc., Austin, TX (US)

(72) Inventors: Karel Povalac, Valasska Polanka (CZ); Pavel Sadek, Roznov (CZ); Pavel Krenek, Prostredni Becva (CZ)

(73) Assignee: NXP USA, Inc., Austin, TX (US)

( * ) Notice: Subject to any disclaimer, the term of this patent is extended or adjusted under 35 U.S.C. 154(b) by 240 days.

(21) Appl. No.: 17/104,206

(22) Filed: Nov. 25, 2020

(65) Prior Publication Data

US 2021/0175638 A1 Jun. 10, 2021

(30) Foreign Application Priority Data

Dec. 9, 2019 (EP) ..................................... 19214617

(51) Int. Cl.
*H01Q 5/35* (2015.01)
*H01Q 21/24* (2006.01)
*H01Q 3/34* (2006.01)
*H01Q 9/04* (2006.01)

(52) U.S. Cl.
CPC ............... *H01Q 21/24* (2013.01); *H01Q 3/34* (2013.01); *H01Q 5/35* (2015.01); *H01Q 9/0407* (2013.01)

(58) Field of Classification Search
CPC ............. H01Q 7/06; H01Q 7/00; H01Q 1/243
See application file for complete search history.

(56) References Cited

U.S. PATENT DOCUMENTS

| 8,633,856 B2 | 1/2014 | Rao | |
|---|---|---|---|
| 2013/0287133 A1* | 10/2013 | Coon | H04B 7/0608 375/267 |
| 2013/0300602 A1 | 11/2013 | Zhou et al. | |
| 2019/0273325 A1 | 9/2019 | Ryoo et al. | |
| 2019/0372239 A1 | 12/2019 | Garrec et al. | |

FOREIGN PATENT DOCUMENTS

| GB | 2563834 A | | 1/2019 |
|---|---|---|---|
| JP | 06326508 A | * | 11/1994 |
| JP | 2014093599 A | | 5/2014 |

(Continued)

OTHER PUBLICATIONS

D. Piazza, P. Mookiah, M. D'Amico and K. R. Dandekar, "Experimental Analysis of Pattern and Polarization Reconfigurable Circular Patch Antennas for MIMO Systems," in IEEE Transactions on Vehicular Technology, vol. 59, No. 5, pp. 2352-2362, Jun. 2010. doi: 10.1109/TVT.2010.2043275 URL: http://ieeexplore.ieee.org/stamp/stamp.jsp?tp=&arnumber=5415665&isnumber=5484898.

(Continued)

*Primary Examiner* — Dieu Hien T Duong (57) ABSTRACT

An apparatus and method for determining location information using a multi-polarized antenna array is disclosed. The multi-polarized antenna array includes a plurality of metal patches and a multiplexer. Each metal patch has at least two feed-points. The multiplexer is coupled to an RF terminal and to each of the at least two feed-points of each of the plurality of metal patches. The antenna array is configurable to couple each feed-point one at a time to the RF terminal. Location information may be determined by a controller coupled to the RF terminal from RF signals received via each feed-point.

20 Claims, 6 Drawing Sheets

(56) References Cited

FOREIGN PATENT DOCUMENTS

WO       2015068252 A1     5/2015

OTHER PUBLICATIONS

L. Brás, M. Oliveira, N. Borges Carvalho, and P. Pinho, "Improved Sectorised Antenna for Indoor Localization Systems," in Microwave Conference (EuMC), 2011 41st European, 2011.
M. Pralon, Compact Antenna Arrays for Efficient Direction of Arrival Estimation, 2017. [online] https://www.db-thueringen.de/servlets/MCRFileNodeServlet/dbt_derivate_00038866/.
M. S. Sharawi and D. N. Aloi, "Design of an 8-element Switched Mode Circular Antenna Array for Vehicular Direction Finding," WAMICON 2011 Conference Proceedings, Clearwater Be.
Vasina et al.: "Beam- and Polarisation-Reconfigurable SIW Ring-Slot Antenna Array", Research Article, IET Journals The Institution of Engineering and Technology, IET Microwaves, Antennas & Propagation, vol. 12, Issue: 15, Dec. 10, 2018, pp. 2313-2319.

\* cited by examiner

MULTI-POLARIZED ANTENNA ARRAY

CROSS-REFERENCE TO RELATED APPLICATIONS

This application claims the priority under 35 U.S.C. § 119 of European Patent application no. 19214617.3, filed on 9 Dec. 2019, the contents of which are incorporated by reference herein.

FIELD

This disclosure relates to a multi-polarized antenna array for localization and method for localization using a multi-polarized antenna array.

BACKGROUND

Radio frequency (RF) transceivers for example Bluetooth, WiFi or other transceivers may use localization techniques for example using Angle of Arrival to estimate the relative location of a RF transmitter or transmitters from a received signal. This localization information may be used to support location based services for example to find an item or in indoor positioning systems to locate a point of interest. The RF transceiver may use an antenna array with predetermined phase difference between the antennas to receive multiple instances of the transmitted signal. These multiple received signals may then be used to determine the angle of arrival.

SUMMARY

Various aspects of the disclosure are defined in the accompanying claims.

In a first aspect there is provided a multi-polarized antenna array for localization comprising: a plurality of metal patches, each metal patch having at least two feed-points; a multiplexer coupled to each of the at least two feed-points of each of the plurality of metal patches and having a signal terminal and a control terminal; wherein the antenna array is configurable to switchably couple each feed-point one at a time to the signal terminal, and to provide RF signals received via each feed-point to a controller configured to determine location information. In one or more embodiments each metal patch may be a symmetric shape.

In one or more embodiments each metal patch may be substantially circular.

In one or more embodiments each metal patch may be each metal patch may include four feed-points.

In one or more embodiments for each metal patch: when the first feed-point of each metal patch is selected, the antenna array is configured to preferentially detect a signal having a first polarization; when the second feed-point is selected the antenna array is configured to preferentially detect a signal having a second polarization; when the third feed-point is selected the antenna array is configured to preferentially detect a signal having a third polarization; when the fourth feed-point is selected the antenna array is configured to preferentially detect a signal having a fourth polarization.

In one or more embodiments the difference between the second polarization and the first polarization may be approximately 45 degrees, the difference between the third polarization and the second polarization may be approximately 45 degrees, and the difference between the fourth polarization may be the third polarization is approximately 45 degrees.

In one or more embodiments, the antenna array may comprise a plurality of metal layers separated by dielectric layers, and wherein a first metal layer comprises the metal patches; a second metal layer comprises a ground plane; a third metal layer comprises a plurality of wave-guides; and wherein each feed-point of each metal patch is configured as a co-axial feed-point comprising a metal via between the first metal layer and the third metal layer and wherein each co-axial feed-point is coupled to a corresponding wave-guide and each wave-guide is coupled to the RF multiplexer.

In one or more embodiments, each of the at least two feed-points of each of the plurality of metal patches may comprise a limb extending from the respective metal patch.

In one or more embodiments, the antenna array may be configured as one of a linear antenna array, a circular antenna array, and a rectangular antenna array.

In one or more embodiments, the plurality of metal patches may be identical and uniformly spaced.

In one or more embodiments, the multi-polarized antenna array may be included in an RF receiver further comprising a controller coupled to a control input and the signal terminal of the multiplexer and configurable to control the multiplexer to switchably couple each feed-point one at a time to the signal terminal, and to determine location information from RF signals received via each feed-point.

In one or more embodiments, the controller may be further configured to determine location information by determining the angle of arrival of the RF signals from the RF signals received at each feed-point.

In a second aspect there is provided a method for localization using a multi-polarized antenna array comprising a plurality of metal patches, each metal patch having at least two feed-points, the method comprising switchably selecting each feed-point one at a time and determining location information from the RF signals detected via each feed-point.

In one or more embodiments, the method may further comprise processing the RF signals received from each feed-point and determining an angle of arrival from the received RF signals.

In one or more embodiments, the method may further comprise processing the RF signals received from each feed-point and determining a received signal strength indication from the received RF signals.

In one or more embodiments, the method may further comprise detecting a first signal having a first polarization from one of the at least two feed-points and detecting a second signal having a second polarization from a second of the at least two feed-points.

In a third aspect there is provided an apparatus for determining location information, the apparatus comprising: an antenna array comprising a plurality of metal patches, each metal patch having at least two feed-points; a multiplexer comprising a plurality of switches, each switch coupled to a respective feed-point; an RF terminal coupled to the plurality of switches; a controller coupled to a control input of the multiplexer and the RF terminal and configurable to switchably couple each feed-point one at a time to the RF terminal, and to determine location information from RF signals received via each feed-point.

In one or more embodiments, the controller is configured during a predetermined time period to switchably couple each feed-point one at a time to the RF terminal. The predetermined time period may comprise a localization time period.

In one or more embodiments, each of the at least two feed-points of each of the plurality of metal patches may comprise a limb extending from the respective metal patch.

In one or more embodiments, each of the at least two feed-points of each of the plurality of metal patches may comprise a coaxial feed-point.

In a fourth aspect there is described a computer program product comprising instructions which, when being executed by a processing unit included in a RF receiver comprising an antenna array, the antenna array comprising a plurality of metal patches, each metal patch having at least two feed-points, cause said processing unit to perform the steps of switchably selecting each feed-point one at a time and determining location information from the RF signals detected via each feed-point.

BRIEF DESCRIPTION OF THE DRAWINGS

In the figures and description like reference numerals refer to like features. Embodiments of are now described in detail, by way of example only, illustrated by the accompanying drawings in which:

FIGS. 3A, 3B, 3C, 3D, and 3E show different implementation layers of a linear antenna array according to one or more embodiments.

DETAILED DESCRIPTION

Figure 1:
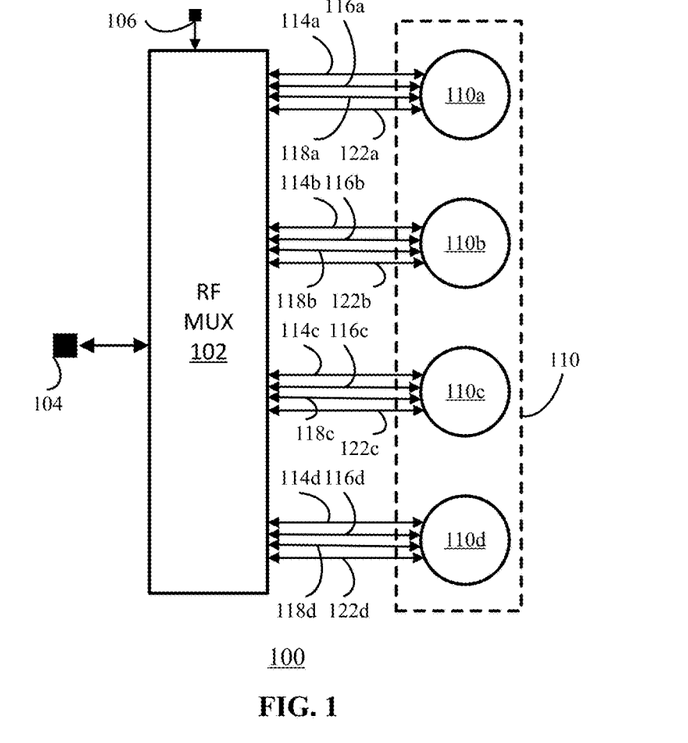
FIG. 1 shows a multi-polarized antenna array for determining location information.

FIG. 1 shows an antenna array 100 for determining location information for RF localisation or direction finding according to an embodiment. The antenna array 100 may include a number of antenna patches 110 for example as illustrated four antenna patches 110a, 110b, 110c, 110d. In other examples there may be fewer or more than four patches. If more than four patches are used, it may be easier for a localization or direction finding procedure to eliminate reflected signals. This is because methods for angle of arrival calculation may be sensitive to the number of received reflections. More antennas with specific spacing (given by the received wave length) can help to eliminate unwanted reflections. The only line of sight (direct free space path) signal is the ideal signal for localization. If two or three patches are used it may not be possible to account for reflected signals in the localization. Each of the four patches 110a-d includes four feed-points 114a-d, 116a-d, 118a-d and 122a-d.

In this disclosure a feed-point may be considered to include the location of the patch at which a connection to the antenna patch is made either to feed the RF signal from other circuitry when an antenna is used for transmission or to tap off a received RF signal which is then supplied to further circuitry when the antenna is used to receive a signal. In some examples the feed-points may be coaxial feed-points having a signal path at least partially shielded by a ground.

As illustrated in FIG. 1, four feed-points 114a-d, 116a-d, 118a-d and 122a-d are shown for each of the patches 110a-d, but in other examples there may be two or more feed-points. Adding feed-points may reduce the gain of each antenna patch compared to a patch with a single feed-point. The feed-points 114a-d, 116a-d, 118a-d and 122a-d may be connected to an RF multiplexer 102. The RF multiplexer 102 may include a number of switches typically implemented using MOSFETs or other transistors. The RF multiplexer 102 may have a control input connected to control input terminal 106. The RF multiplexer 102 may have a RF signal terminal connected to RF terminal 104. The control input may determine which of the feed-points 114a-d, 116a-d, 118a-d and 122a-d are connected to the RF terminal 104 via multiplexer signal terminal. In operation the RF multiplexer 102 may be controlled via control input terminal 106 to selectively couple the feed-points 114a-d, 116a-d, 118a-d and 122a-d one at a time to the RF terminal 104.

Each of the different feed-points 114a-d, 116a-d, 118a-d and 122a-d when selected may affect the sensitivity of the patch 110a-d to a particular polarization plane of a received RF signal. Hence the antenna-array 100 may be considered to be a multi-polarized antenna array. As illustrated the antenna array 100 implements a multi-polarized antenna array consisting of 16 antennas. The RF signals received by each of the antennas may be routed to a processor or controller (not shown) via the RF multiplexer 102 which may then determine location information such as angle of arrival from the received RF signals.

The inventors of the present disclosure have appreciated that adding multiple feed-points for each antenna patch which are then selected individually may allow a more compact antenna array to be formed since each antenna patch implements multiple antennas. A circular patch may allow a symmetrical response in all directions without having a dependency on the probe angle position of the patch. However, other symmetrical shapes such as squares, rectangles, star, or ellipses may be used. Some of these shapes may result in a different frequency response dependent on the location of the probe feed-point. Shapes with corners may have distortions and consequently in some examples shapes with rounded edges may be used.

The antenna array 100 is a uniform linear antenna array which may allow the angle of arrival of a detected RF signal to be determined with minimal computation overhead. However, other examples may use different arrangements of antenna patches for example a matrix or a non-linear arrangement of the antenna patches. Some examples may use a uniform circular array or uniform matrix array. The arrangement of the antenna patches may determine which localization algorithm is used.

Figure 2:
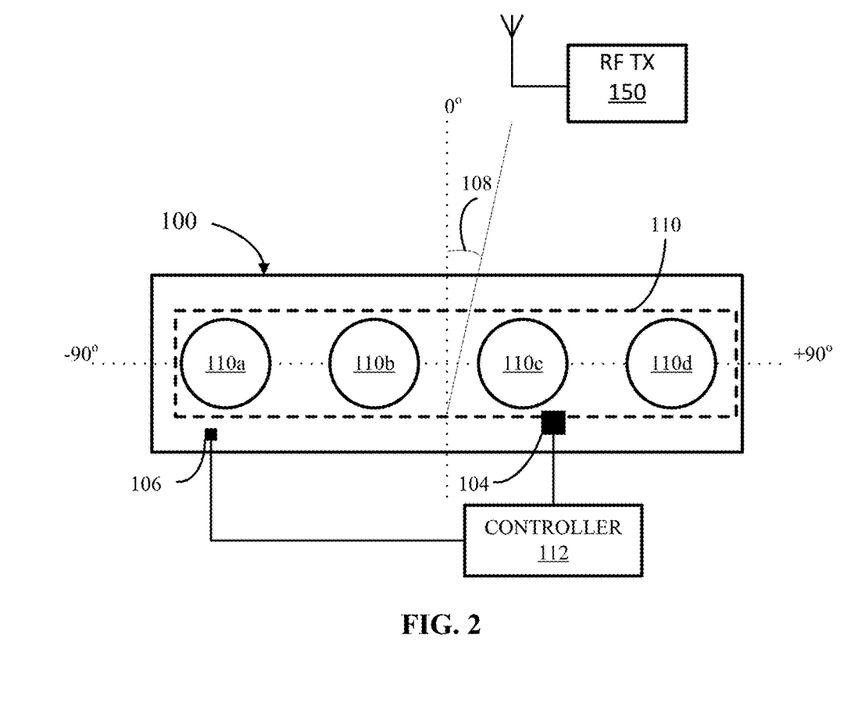
FIG. 2 illustrates a RF receiver including the multi-polarized antenna array of FIG. 1 according to an example embodiment.

FIG. 2 shows an RF receiver including the antenna array 100 and a controller 112. The antenna patches 110 may be implemented on a substrate such as a multi-layer printed circuit board. The RF multiplexer 102 (not shown) may also be implemented by one or more RF switches. The controller 112 may have an RF input connected to the RF terminal 106 using a connecter such as for example a sub-miniature version A (SMA) RF connector. The controller 112 as illustrated may be included on the same substrate as the antenna array 100 or a different printed circuit board. The controller 112 may be implemented in hardware or a combination of hardware and software for example software executed on microprocessor, microcontroller or digital signal processor. The controller 112 may be implemented as a single device or multiple devices. The controller may have a control output connected to the control input 106.

In operation, the controller 112 may perform a localisation procedure to determine an approximate relative location of an RF transmitter 150 from a number of RF signals received from that transmitter. This localisation procedure may occur during a predetermined time period or localization time period. For example some applications used wireless standards such as Bluetooth may initiate a localization procedure during a start-up or initialization phase. The controller 112 may control the RF multiplexer 102 to select the feed-points 114*a-d*, 116*a-d*, 118*a-d* and 122*a-d* one at a time via control connections 106. For example, the controller 112 may sequentially select each of the four feed-points 114*a*, 116*a*, 118*a*, 122*a* of patch 110*a* followed by each of the four feed-points 114*b*, 116*b*, 118*b*, 122*b* of patch 110*ab* then each of the feed-points 114*c*, 116*c*, 118*c*, 122*c* of patch 110*c* and finally each of the feed-points 114*d*, 116*d*, 118*d*, 122*d* of patch 110*d*. In other examples, different selection sequences may be used. In some examples the RF receiver may be incorporated together with an RF transmitter circuit and the antenna array 100 may be used for receiving and transmitting RF signals.

The RF multiplexer 102 may be implemented using MOS transistor switches or other transistor switches. The RF multiplexer 102 may be a single device or multiple devices.

RF transmitter 150 may transmit a RF signal having an angle of arrival 108 which may vary from −90 degrees to +90 degrees. This RF signal may be detected by the active selected antenna corresponding to the selected patch, that is to say one of 110*a-d* and the selected feed-point in the selected patch. By cycling through all the feed-points the RF signal transmitted by the transmitter is detected by the equivalent of 16 separate antennas. Each of the different feed-points correspond to an antenna which is sensitive to a particular polarization plane, although adding multiple feed-points may reduce the effective antenna gain.

The RF signal detected by each of the different antennas may then be used by the controller 112 to determine location information such as an angle of arrival and/or RSSI using known methods and so determine a measure of the relative location of the RF receiver 100 to the RF transmitter 150. The antenna patches 110*a-d* may be uniformly distributed and be separated by a centre-to-centre distance equal to a fraction of the wavelength (λ) of the RF signal of interest. For example the separation may be λ/2, λ/4 or λ/8. The actual distance will depend on the geometry and the relative permittivity of the material used to make the substrate.

Having a separation between antenna patches corresponding to fractions of a wavelength may simplify some localization processes for example the determination of the angle-of-arrival. In some examples the RF transmitter 150 may be included in a RF transceiver in a mobile device and the RF receiver including antenna array 100 may be included in a RF transceiver in a wireless router. In this example, once the location information has been determined by the RF receiver, this location information may be transmitted to the mobile device for use in various applications.

FIGS. 3A, 3B, 3C, 3D, 3E show layers of the linear antenna array 100 according to one or more embodiments implemented on a multi-layer printed circuit board 120.

Figure 3A:
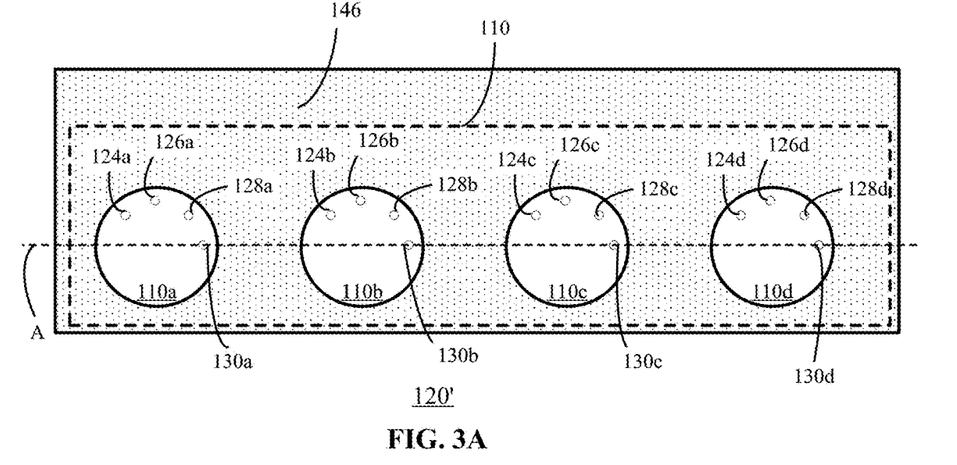
FIG. 3A shows a plan view of a first metal layer of an example embodiment of the linear antenna array including four antenna patches.

FIG. 3A shows a plan view of the printed circuit board 120 showing the metal layer 120' used to form the antenna patches 110*a-d*. The metal has been removed from the dielectric region 146. The antenna patch 110*a* has a corresponding four coaxial feed-points 124*a*, 126*a*, 128*a*, and 130*a*. Similarly antenna patches 110*b-d* have corresponding four coaxial feed-points 124*b-d*, 126*b-d*, 128*b-d*, and 130*b-d*. These coaxial feed-points correspond to the location where a via contact is made to each of the antenna patches 110*a-d*.

Figure 3B:
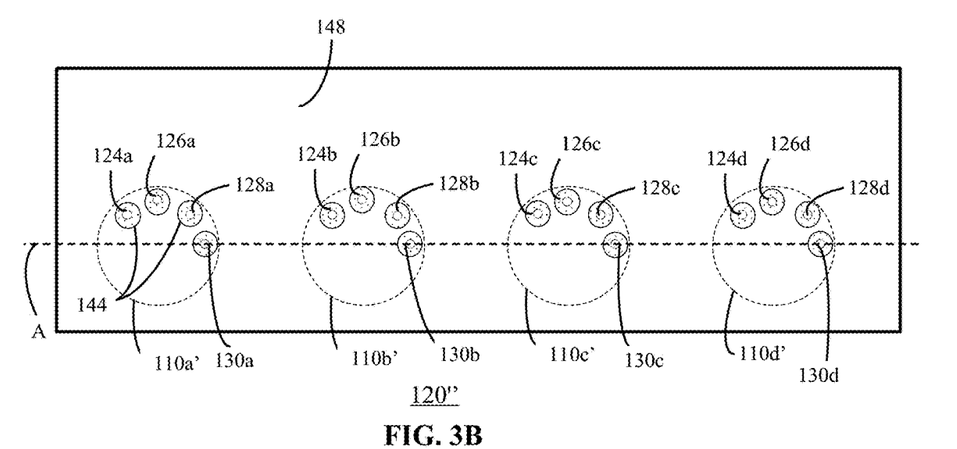
FIG. 3B shows a plan view of a second metal layer an example embodiment of the linear antenna array of including the ground plane.

FIG. 3B shows a plan view of the printed circuit board 120 showing a second metal layer 120" used to form the ground plane. The four coaxial feed-points 124*a*, 126*a*, 128*a*, and 130*a* include metal vias passing through the metal layer 120". Each metal via is separated by a dielectric region 144 from the metal region 148 which is typically a ground. Hence each via is shielded by a ground region similarly to a coaxial cable which may reduce signal interference.

Similarly antenna patches 110*b-d* have corresponding four coaxial feed-points 124*b-d*, 126*b-d*, 128*b-d*, and 130*b-d*. These coaxial feed-points correspond to the location where a via contact is made to each of the antenna patches 110*a-d*. The dashed lines 110*a'-d'* show the position of the corresponding antenna patches 110*a-d* in the second metal layer 120"

Figure 3C:
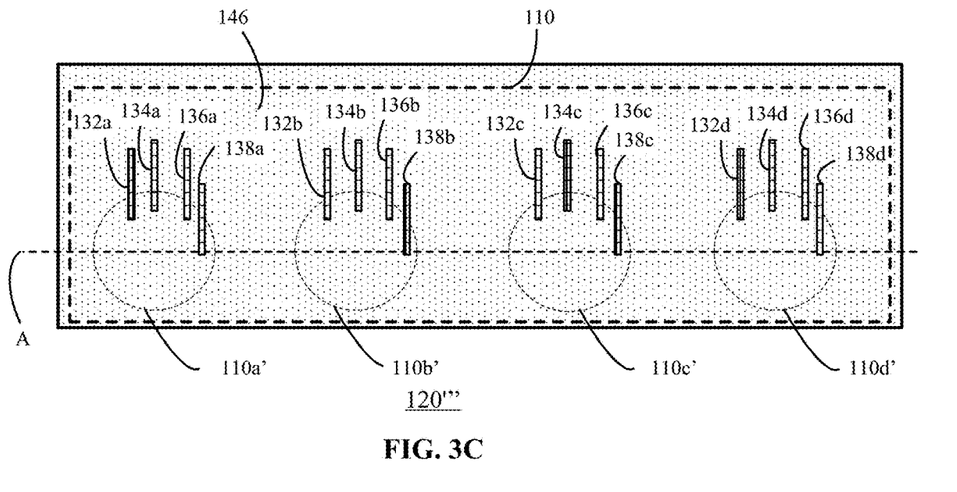
FIG. 3C shows a plan view of a third metal layer of an example embodiment of the linear antenna array of including the coplanar waveguides.

FIG. 3C shows a plan view of the third metal layer 120'" used to form the co-planer waveguides 132*a-d*, 134*a-d*, 136*a-d* and 138*a-d*. Each of the antenna patches 110*a-d* has four corresponding waveguides. The co-planer waveguides 132*a-d*, 134*a-d*, 136*a-d* and 138*a-d* may be formed as a metal line for the signal with two parallel metal lines either side which may be ground lines. The signal and ground lines may be separated by cavities in the layer 120'". As illustrated the co-planer waveguides 132*a-d* are routed in parallel. In other examples the waveguides 132*a-d* may diverge in direction as the orientation of the waveguides does not affect the sensitivity of the antenna to the polarization angle of the RF signal. The sensitivity of the antenna to the polarization angle is determined by the point of contact of the feed-point with the antenna patch 110*a-d*. In some examples the routing between the waveguides 132*a-d* and the multiplexers may be selected so that the total path from the antenna patches to each multiplexer input is the same. This may equalise the signal delay regardless of which antenna feed-point is selected which may simplify the subsequent processing of the RF signals.

For example the antenna patch 110*a* may have a first co-planer waveguide 132*a* which is connected to the first coaxial feed-point 124*a* with a via (not shown), a second co-planer waveguide 134*a* which is coupled to the second coaxial feed-point 126*a* with a via (not shown), a third co-planer waveguide 136*a* which is coupled to the third coaxial feed-point 128a with a via (not shown), and a fourth co-planer waveguide 138a which is coupled to the fourth coaxial feed-point 130a with a via (not shown). The other co-planar waveguides 132b-d, 134b-d, 136b-d, and 138b-d are similarly coupled to corresponding coaxial feed-points 124b-d, 126b-d, 128b-d. Each of the co-planar wave guides may be coupled to a respective terminal of the RF multiplexer (not shown).

The dashed lines 110a'-d' show the position of the corresponding antenna patches 110a-d in the metal layer 120' in relation to the respective waveguides. The dashed line A corresponds to horizontal or 0 degrees polarization. With reference to antenna patch 110a, when fourth coaxial feed-point 130a is selected, the antenna is more sensitive to a horizontal polarized signal, when third coaxial feed-point 128a is selected, the antenna is more sensitive to a 45 degrees polarized signal, when second coaxial feed-point 126a is selected, the antenna is more sensitive to a 90 degrees or vertical polarized signal, when first coaxial feed-point 124a is selected, the antenna is more sensitive to a 135 degrees polarized signal. It will be appreciated that the polarization angles are relative to each other.

Figure 3D:
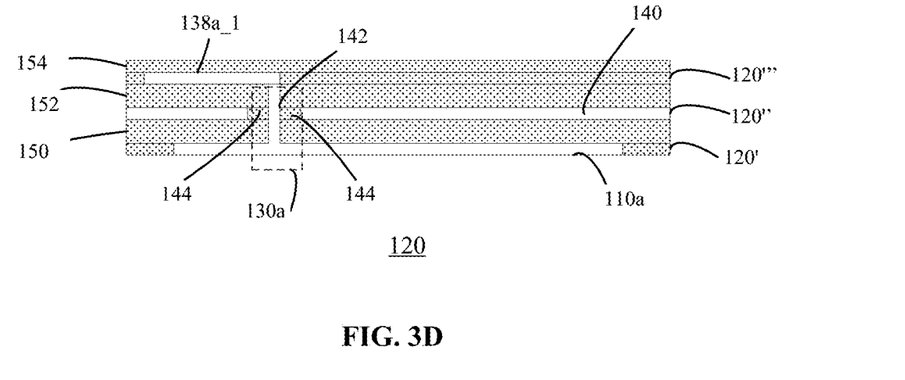
FIG. 3D shows a cross section of part of the example embodiment of the linear antenna array shown in FIG. 3A, 3B, 3C.

FIG. 3D shows a horizontal cross-section of printed circuit board 120 as indicated by dashed line A in FIGS. 3A, 3B and 3C showing one of the antenna patches 110a. Cross section shows metal layers 120', 120'',120''' alternating with dielectric layers 150,152,154. The first metal layer 120' is used to implement the antenna patch 110a. The second metal layer 120'' implements a ground plane 140. The co-planar waveguide 138a is formed in the third metal later 120''' and the wave guides are separated by a second metal layer 120'' which may form a ground plane 140. Metal via 142 forms the coaxial feed-point 130a to the waveguide 138a.

As an example a first metal layer 120' may have a thickness of 0.017 mm, first dielectric layer 150 may have a thickness of 1.5 mm, second metal layer 120'' may have a thickness of 0.035 mm, second dielectric layer 152 may have a thickness of 0.3 mm, and third metal layer 120''' may have a thickness of coplanar waveguides 0.017 mm. The dimensions of the layers may vary dependent on the material properties of the substrates used to implement the antenna array.

Figure 3E:
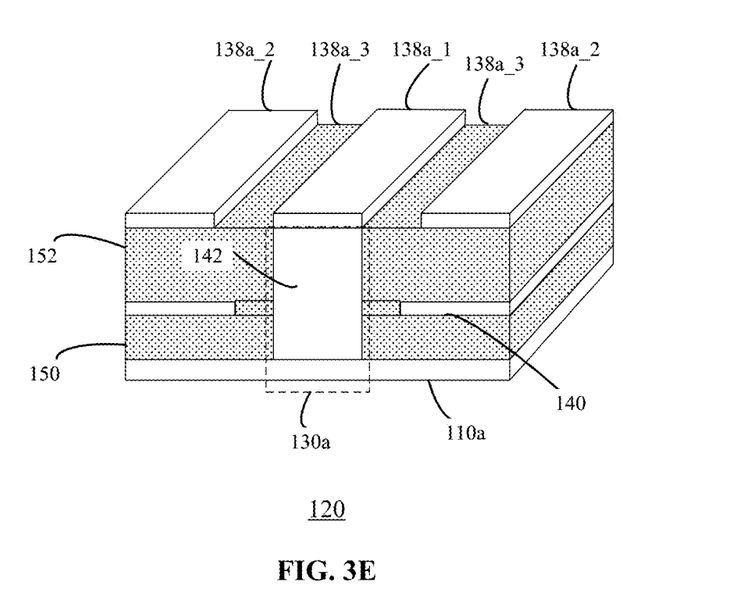
FIG. 3E shows a three-dimensional cross section of part of the example embodiment of the linear antenna array shown in FIG. 3A, 3B, 3C, 3D.

FIG. 3E shows a three-dimensional cross section of the printed circuit board 120 as indicated by dashed line A in FIGS. 3A, 3B and 3C showing one of the antenna patches 110a omitting dielectric layer 154. FIG. 3E shows more detail of one of the co-planar wave guides 138a which includes a signal line 138a_1, two ground lines 138a_2 either side of the signal line and two cavities 138a_3 between the signal line 138a_1 and the ground lines 138a_2.

Figure 4:
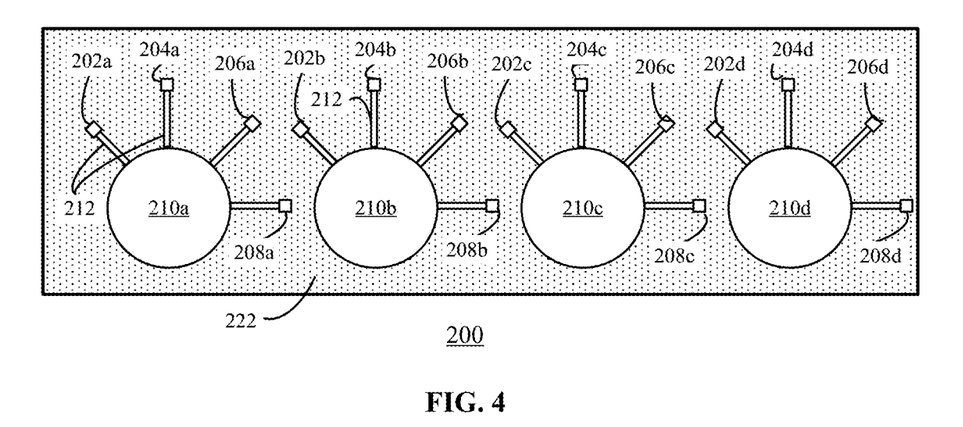
FIG. 4 shows a plan view of an antenna array including the antenna patches according to an embodiment.

FIG. 4 shows an alternative implementation of an antenna array on a substrate 200 according to an embodiment. Four substantially circular metal antenna patches 210a-d may be equally separated by dielectric region 222. In this example, the feed-points 202a-d, 204a-d, 206a-d, 208a-d are formed by metal limbs 212 extending from the circular patches 210a-d. In some examples a respective input of the RF multiplexer (not shown) may be connected directly to the end of each of the feed-points 202a-d, 204a-d, 206a-d, 208a-d on the same layer of the printed circuit board. In other examples the feed-points 202a-d, 204a-d, 206a-d, 208a-d may further include vias (not shown) which connect the feed-points to co-planer waveguides or other waveguides.

Figure 5:
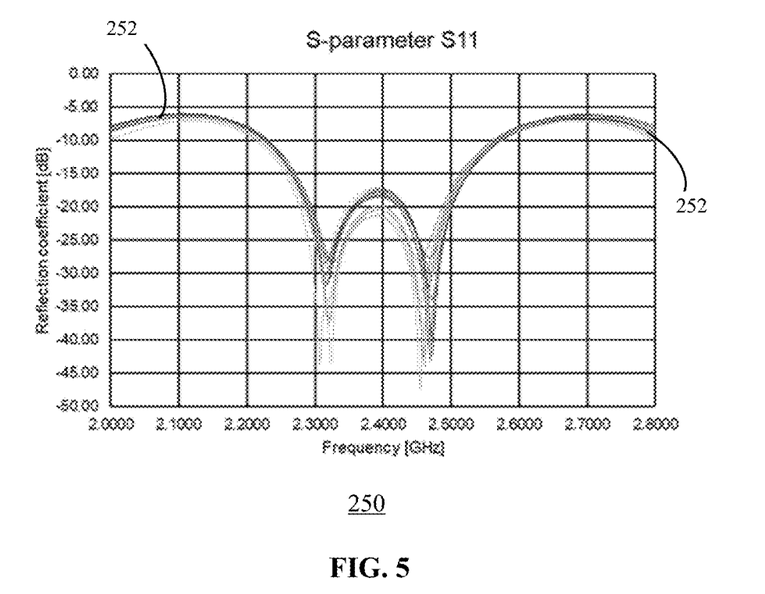
FIG. 5 shows a measured reflection coefficient of an example antenna array of the 16 antennas of the linear antenna array of FIGS. 3A, 3B, 3C, 3D and 3E.
Figure 6:
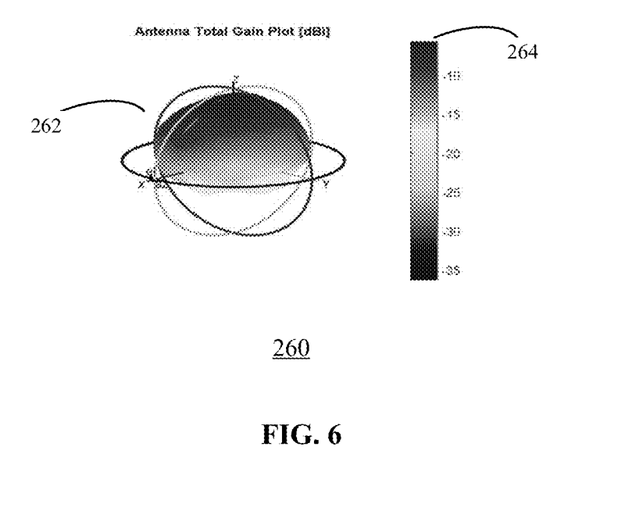
FIG. 6 shows a total gain plot of the linear antenna array of FIGS. 3A, 3B, 3C, 3D and 3E.
Figure 7:
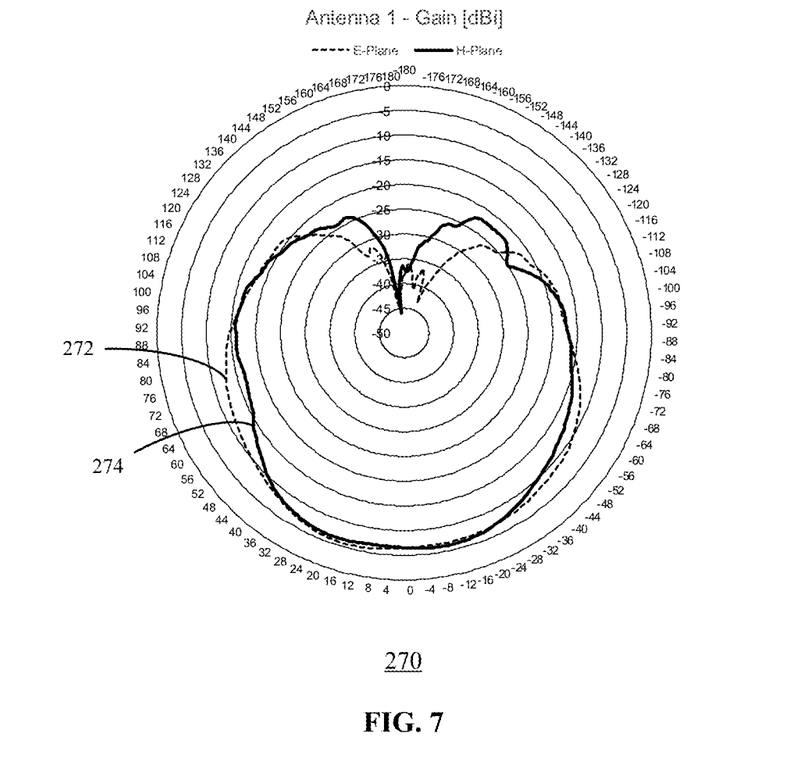
FIG. 7 shows a polar plot of the E-plane and the H-plane of one antenna of the linear antenna array of FIGS. 3A, 3B, 3C, 3D and 3E.

FIGS. 5,6 and 7 show measured parameters for an example antenna implemented as shown in FIGS. 3A to 3E This antenna may receive signals having a frequency of approximately 2.4 GHz. Other example antenna may be tuned to a different frequency. FIG. 5 shows a plot 250 of the reflection coefficient in dB on the y-axis varying between −50 and 0 versus the frequency on the x-axis varying between 2 GHz and 2.8 GHz. The response of the 16 different antenna corresponding to 4 feed-points multiplied by 4 antenna patches as shown in lines 252 is reasonably uniform.

FIG. 6 shows the antenna gain in dBi in three-dimensional space 260. The three-dimensional plot 262 corresponds to a gain between −5 and −35 dB indicated by the grey-scale 264. FIG. 7 shows a polar char 270 showing the gain in the E-plane 272 and the H-plane 274 for one antenna. Table 1 below shows the corresponding values and frequency bandwidth.

TABLE 1

| Antenna/<br>Feed-point | Phi<br>[°] | Max_Gain<br>[dBi] | Theta<br>radiation<br>width<br>[°] | Freq<br>bandwidth<br>[MHz] |
|---|---|---|---|---|
| Ant_01/124a | 135 | −5.67992 | 87 | 354.5 |
| Ant_02/126a | 90 | −6.70911 | 84 | 354 |
| Ant_03/128a | 45 | −6.84688 | 86 | 345 |
| Ant_04/130a | 0 | −5.83957 | 83 | 333 |
| Ant_05/124b | 135 | −5.82818 | 105 | 337.5 |
| Ant_06/126b | 90 | −6.15797 | 83 | 347.5 |
| Ant_07/128b | 45 | −6.96724 | 102 | 347 |
| Ant_08/130b | 0 | −6.30252 | 86 | 331 |
| Ant_09/124c | 135 | −6.3256 | 104 | 336 |
| Ant_10/126c | 90 | −6.47986 | 86 | 348.5 |
| Ant_11/128c | 45 | −7.28999 | 105 | 346.5 |
| Ant_12/130c | 0 | −6.58646 | 133 | 338 |
| Ant_13/124d | 135 | −5.67992 | 87 | 340.5 |
| Ant_14/126d | 90 | −6.55092 | 83 | 347.5 |
| Ant_15/128d | 45 | −6.3982 | 90 | 354.5 |
| Ant_16/130d | 0 | −5.83957 | 81 | 341 |

In this example, the frequency bandwidth 350 MHz so for example for an antenna tuned to a frequency of 2.4 GHz, signals in the range of 2.3 GHz and 2.5 GHz may also be detected. The worst case isolation among ports −5 dB in this example where there are 45° degrees between two adjacent ports. The lower total antenna gain −5.6 dBi. The antenna frequency bandwidth increases with additional feeding points, while the antenna gain decreases.

In some examples the antenna array may use a modified FR4 dielectric material called 370HR for dielectric layers. In other examples, the Antenna gain can be improved (up to 0 dBi) using a dedicated RF dielectric with lower dissipation factor, tan δ, which represents losses in the dielectric material. For example normal FR4 material has 10 times higher losses then the dedicated RF substrate. Lower losses may result in improved signal radiation from of the substrate material.

Figure 8:
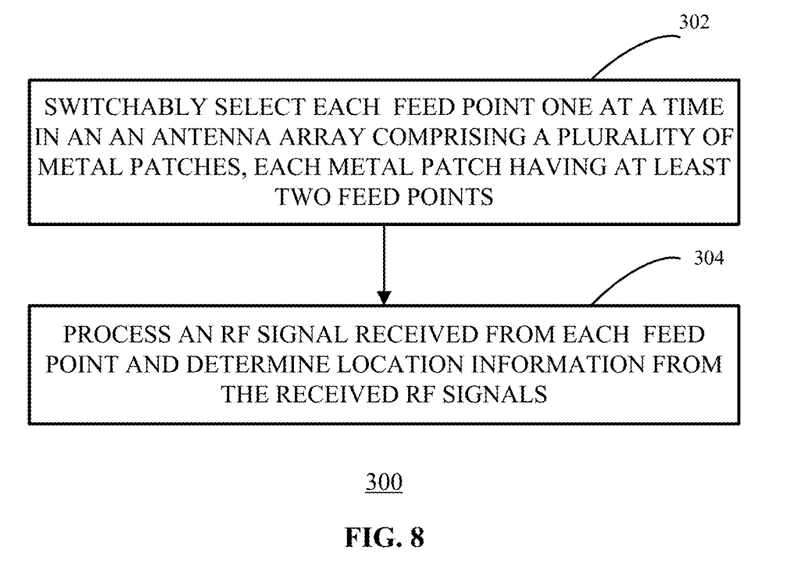
FIG. 8 shows a method of determining location information using a multi-polarized antenna array according to an example embodiment.

FIG. 8 shows a method of localization of an RF transmitter using a multi-polarized antenna 300. In step 302 a probe feed-point may be switchably selected one at a time in an antenna array comprising a plurality of metal patches, each metal patch having at least two probe feed-points which may be coaxial feed-points. In step 304 an RF signal received from each feed-point may be processed to determine location information of the RF signal which may be used for example to determine a location direction of an RF transmitter. Determining the location information may include determining an angle of arrival using any suitable method. Determining the location information may also include determination of the received signal strength indication (RSSI).

An apparatus and method for determining location information using a multi-polarized antenna array is disclosed. The multi-polarized antenna array includes a plurality of metal patches and a multiplexer. Each metal patch has at least two feed-points. The multiplexer is coupled to an RF terminal and to each of the at least two feed-points of each of the plurality of metal patches.

The antenna array is configurable to couple each feed-point one at a time to the RF terminal. Location information may be determined by a controller coupled to the RF terminal from RF signals received via each feed-point.

Examples of the RF receiver including the antenna array described herein may be included for example in a RF transceiver for example a Bluetooth LE or IEEE 802.15.4 for localization of a RF transmitter. The antenna array may arrange identical antenna elements along a line in space with uniform spacing. In some example in the ISM band (2.4 GHz) the Reflective power ratio S11 of the all antenna elements may be below −10 dB in the useful frequency band. The frequency bandwidth may be wider than 80 MHz if possible. Further the circular patches may result in a substantially isotropic radiation pattern. By having multiple feed-points for each antenna patch, the effective number of antenna is increased which may result in a reduced printed circuit board size for implementation.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A multi-polarized antenna array for localization comprising:
   a plurality of metal patches, each metal patch having at least two feed-points;
   a multiplexer coupled to each of the at least two feed-points of each of the plurality of metal patches and having a signal terminal and a control terminal;
   wherein the antenna array is configurable to switchably couple each feed-point one at a time to the signal terminal, and to provide RF signals received via each feed-point to a controller configured to determine location information;
   wherein the antenna array comprises a plurality of metal layers separated by dielectric layers, and wherein:
   a first metal layer comprises the metal patches;
   a second metal layer comprises a ground plane;
   a third metal layer comprises a plurality of wave-guides; and wherein each feed-point of each metal patch is configured as a co-axial feed-point comprising a metal via between the first metal layer and the third metal layer and wherein each co-axial feed-point is coupled to a corresponding wave-guide and each wave-guide is coupled to the RF multiplexer.

2. The multi-polarized antenna array of claim 1 wherein each metal patch is a symmetric shape.

3. The multi-polarized antenna array of claim 1 wherein each metal patch is substantially circular.

4. The multi-polarized antenna array of claim 1 wherein each metal patch includes four feed-points.

5. The multi-polarized antenna array of claim 4 wherein for each metal patch:
   when the first feed-point of each metal patch is selected, the antenna array is configured to preferentially detect a signal having a first polarization;
   when the second feed-point is selected the antenna array is configured to preferentially detect a signal having a second polarization;
   when the third feed-point is selected the antenna array is configured to preferentially detect a signal having a third polarization;

when the fourth feed-point is selected the antenna array is configured to preferentially detect a signal having a fourth polarization.

6. The multi-polarized antenna array of claim 5 wherein the difference between the second polarization and the first polarization is approximately 45 degrees, the difference between the third polarization and the second polarization is approximately 45 degrees, and the difference between the fourth polarization and the third polarization is approximately 45 degrees.

7. The multi-polarized antenna array of claim 1 wherein each of the at least two feed-points of each of the plurality of metal patches comprises a limb extending from the respective metal patch.

8. The multi-polarized antenna array of claim 1 configured as one of a linear antenna array, a circular antenna array, and a rectangular antenna array.

9. The multi-polarized antenna array of claim 1 wherein the controller is coupled to the RF terminal and is configured to determine location information by determining the angle of arrival of the RF signals from the RF signals received at each feed-point.

10. An RF receiver comprising the multi-polarized antenna array of claim 1 and further comprising a controller coupled to a control input and the signal terminal of the multiplexer and configurable to control the multiplexer to switchably couple each feed-point one at a time to the signal terminal, and to determine location information from RF signals received via each feed-point.

11. The RF receiver of claim 10 wherein the controller is further configured to determine location information by determining the angle of arrival of the RF signals from the RF signals received at each feed-point.

12. A multi-polarized antenna array for localization comprising:
a plurality of metal patches, each metal patch having at least two feed-points;
a multiplexer coupled to each of the at least two feed-points of each of the plurality of metal patches and having a signal terminal and a control terminal;
wherein the antenna array is configurable to switchably couple each feed-point one at a time to the signal terminal, and to provide RF signals received via each feed-point to a controller configured to determine location information;
wherein each metal patch includes a first feed-point, a second feed-point, a third feed-point, and a fourth feed-point, and for each metal patch:
when the first feed-point of each metal patch is selected, the antenna array is configured to preferentially detect a signal having a first polarization;
when the second feed-point is selected the antenna array is configured to preferentially detect a signal having a second polarization;
when the third feed-point is selected the antenna array is configured to preferentially detect a signal having a third polarization;
when the fourth feed-point is selected the antenna array is configured to preferentially detect a signal having a fourth polarization; and
wherein the difference between the second polarization and the first polarization is approximately 45 degrees, the difference between the third polarization and the second polarization is approximately 45 degrees, and the difference between the fourth polarization and the third polarization is approximately 45 degrees.

13. A method for localization using a multi-polarized antenna array comprising a plurality of metal patches, each metal patch having at least two feed-points, the method comprising switchably selecting each feed-point one at a time via an RF multiplexer and determining location information from the RF signals detected via each feed-point, wherein the antenna array comprises a plurality of metal layers separated by dielectric layers, and wherein:
a first metal layer comprises the metal patches;
a second metal layer comprises a ground plane;
a third metal layer comprises a plurality of wave-guides, wherein each feed-point of each metal patch is configured as a co-axial feed-point comprising a metal via between the first metal layer and the third metal layer and wherein each co-axial feed-point is coupled to a corresponding wave-guide and each wave-guide is coupled to the RF multiplexer.

14. The method of claim 13 further comprising, processing the RF signals received from each feed-point and determining an angle of arrival from the received RF signals.

15. The method of claim 13 further comprising, processing the RF signals received from each feed-point and determining a received signal strength indication from the received RF signals.

16. The method of claim 13 further comprising detecting a first signal having a first polarization from one of the at least two feed-points and detecting a second signal having a second polarization from a second of the at least two feed-points.

17. An apparatus for determining location information, the apparatus comprising:
an antenna array comprising a plurality of metal patches, each metal patch having at least two feed-points;
a multiplexer comprising a plurality of switches, each switch coupled to a respective feed-point;
an RF terminal coupled to the plurality of switches;
a controller coupled to a control input of the multiplexer and the RF terminal and configurable to switchably couple each feed-point one at a time to the RF terminal, and to determine location information from RF signals received via each feed-point,
wherein the antenna array comprises a plurality of metal layers separated by dielectric layers, and wherein:
a first metal layer comprises the metal patches;
a second metal layer comprises a ground plane;
a third metal layer comprises a plurality of wave-guides; and wherein each feed-point of each metal patch is configured as a co-axial feed-point comprising a metal via between the first metal layer and the third metal layer and wherein each co-axial feed-point is coupled to a corresponding wave-guide and each wave-guide is coupled to the multiplexer.

18. The apparatus of claim 17 wherein the controller is configured during a predetermined time period to switchably couple each feed-point one at a time to the RF terminal.

19. The apparatus of claim 16 wherein each of the at least two feed-points of each of the plurality of metal patches comprises a limb extending from the respective metal patch.

20. A method for localization using a multi-polarized antenna array comprising a plurality of metal patches, each metal patch having at least two feed-points, the method comprising switchably selecting each feed-point one at a time via an RF multiplexer and determining location information from the RF signals detected via each feed-point, wherein each metal patch includes a first feed-point, a second feed-point, a third feed-point, and a fourth feed-point, and the method further includes, for each metal patch:

when the first feed-point of each metal patch is selected, preferentially detecting a signal having a first polarization;

when the second feed-point is selected, preferentially detecting a signal having a second polarization;

when the third feed-point is selected, preferentially detecting a signal having a third polarization; and when the fourth feed-point is selected, preferentially detecting a signal having a fourth polarization, wherein the difference between the second polarization and the first polarization is approximately 45 degrees, the difference between the third polarization and the second polarization is approximately 45 degrees, and the difference between the fourth polarization and the third polarization is approximately 45 degrees.

* * * * *